June 7, 1927.
S. ALLINGHAM
1,631,612
MACHINE FOR HARVESTING FLAX AND OTHER PLANTS
Filed June 18, 1925
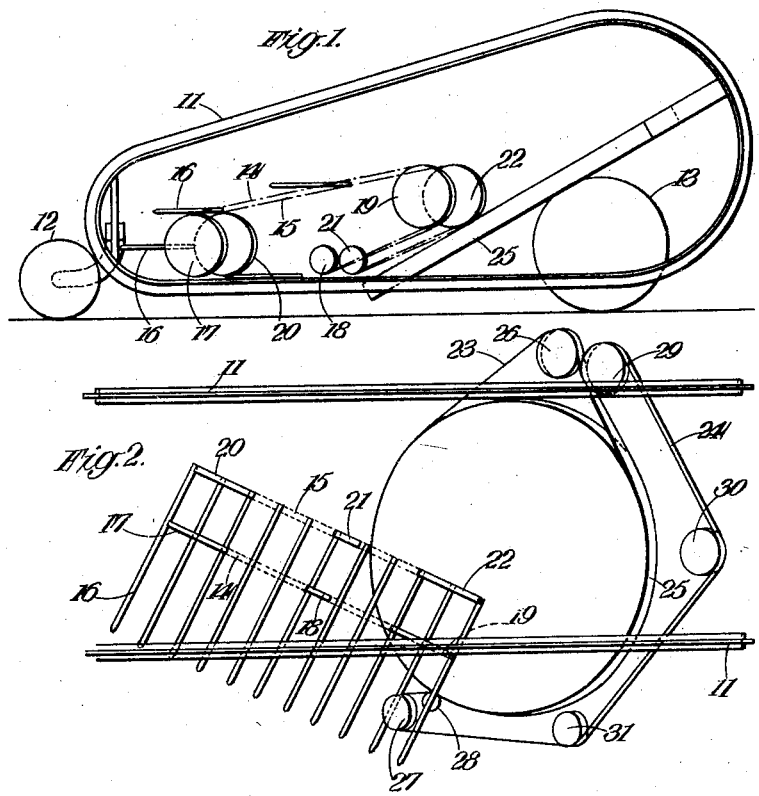

Patented June 7, 1927.

1,631,612

UNITED STATES PATENT OFFICE.

SIDNEY ALLINGHAM, OF LONDON, ENGLAND, ASSIGNOR TO ROBERT BOBY LIMITED, OF BURY ST. EDMUNDS, ENGLAND, A BRITISH COMPANY.

MACHINE FOR HARVESTING FLAX AND OTHER PLANTS.

Application filed June 18, 1925, Serial No. 37,901, and in Great Britain October 6, 1924.

This invention relates to machines for uprooting flax and other plants, of which the fibre of the stalks is intended to be used, and in the gathering of which it is therefore necessary to avoid lashing, breaking, or cutting of the stalks, as distinguished from crops such as corn wherein the value resides mainly in the tops of the growths and in the harvesting of which it is customary to cut the stalks at some little distance above the ground, or from root crops such as beetroot, onions, or potatoes, where the roots are first lifted by means operating in the ground under them, and the growth above ground is practically waste material, the treatment of which in harvesting is unimportant.

In such uprooting machines for flax and the like it is desirable that any stalks of the crop which have been laid, bowed, or entangled by storms or from other causes should be lifted so that they can be readily seized by uprooting belts and passed in parallel order between such belts. In known flax harvesting machines special lifting devices acting before the uprooting devices have been provided for this purpose. The stalk lifting devices in the type of machines to which the present invention relates comprised endless belts or chains driven by gearing from the track wheels of the machine and travelling in an approximately triangular path, transversely of which belts or chains were provided a series of horizontal rods or erecting needles adapted to be consecutively protruded beyond the side of the machine into the crop and then consecutively withdrawn within the frame of the machine, these rods always pointing in the same direction, that is, towards the crop, so that no lashing action tending to break the stalks could take place such as would occur in the case of needles projecting radially from the belts, that is, lying with their length in the same plane as that in which the belts travelled. The operative part of the path of the belts or chains (that is, from the position at which any individual needle began to enter between the stalks of the crop to the position at which that needle was carried out of contact with the stalks at the same time as the stalks which had been erected by that needle were seized by the pulling belts) comprised a horizontal portion in which the whole or part of the lateral protrusion of the needles beyond the side of the machine took place, and an inclined portion during which the needles rose in contact with the stalks; the inclined portion travelled in a direction nearly opposite to that of the advance of the machine, and at such a speed that the advance of the machine counteracted the longitudinal component of the movement of the said inclined portion, so that each erecting needle while penetrating laterally between the stalks also moved upwardly in contact therewith, the needles acting singly to lift the stalks and not to convey them longitudinally.

In machines of the said type existing prior to the present invention, the endless belts or chains constituting the needle carrier ran in an axial direction relatively to the direction of the advance of the machine and the needles were reciprocated at right angles thereto by mechanism arranged to engage each of such needles consecutively to cause the said needles to protrude laterally from the machine, lift, and retract, each needle being operated individually, such mechanism being heavy, costly and liable to derangement.

According to the present invention the needle carrier in a machine of the above type is placed obliquely instead of parallel to the axis of the machine.

From this oblique position of the carrier is obtained the advantage that the consecutive protrusion and retraction of each of the needles is effected solely by the travel of the carrier, without transverse movement of any needle relatively to the carrier.

In order that the said invention may be clearly understood and readily carried into effect, the same will now be described more fully with reference to the accompanying drawings, in which—

Figure 1 is a diagrammatical elevation of a machine illustrating an embodiment of the invention.

Figure 2 is a diagrammatical plan of the machine represented in Figure 1.

The framework of the travelling machine is indicated at 11, this framework being provided with road wheels 12, 13, from the latter of which the erecting and pulling mechanism are driven by suitable gearing which may be of the kind usually employed in machines of this type. The erecting mechanism comprises a pair of parallel chains 14, 15, carrying needles or lifting rods 16; one of these chains, 14, passes around three pulleys or sprocket wheels 17, 18, 19 and the other of the said chains 15 similarly passes around three pulleys or sprocket wheels 20, 21, and 22 in parallel with the chain 14, the path of each chain being located in a vertical plane oblique in relation to the direction of the advance of the machine; each of the needles or lifting rods 16 is rigidly secured to both chains, so that in its operative movement, that is, while it is being carried on the chains from the pulleys 17 and 20 to the pulleys 18 and 21 horizontally, and then rising from the pulleys 18 and 21 to the pulleys 19 and 22, it is gradually protruded beyond the side of the machine as will be seen on referring to Figure 2 in regard to the series of needles there represented without transverse movement in relation to the chains. At the pulleys 19 and 22 the needles leave the stalks which they have erected, and return inoperatively to the pulleys 17 and 20, while the said stalks are gripped and drawn into the machine between two endless travelling belts 23 and 24, and thereby uprooted. The belt 23 passes around the large disc or pulley 25 and the smaller pulley 26, while the belt 24 passes around the pulleys 27, 28, and 29, at which latter it releases the pulled stalks, and returns by way of the pulleys 30 and 31 to the pulley 27.

What I claim and desire to secure by Letters Patent of the United States is:—

1. In a travelling machine for uprooting flax and other fibre producing plants, means for erecting the stalks of said plants before their natural connection with the ground is disturbed, in combination with uprooting devices adapted to seize said stalks after erection, said erecting means comprising an endless flexible needle carrier adapted to move in a vertical plane, said carrier having an inclined operative portion travelling in a direction approximately opposite to that of the advance of the machine and a return portion vertically superposed over said inclined portion, said carrier being arranged obliquely in relation to the advance of the machine and provided with a series of substantially horizontal needles projecting transversely from the plane of the path of the carrier and pointing throughout their forward and return travel toward the ungathered crop, each of said needles being adapted to rise in free contact with any stalks of the crop it may encounter and to rub along said stalks lengthwise thereof to erect said stalks and then leave them free to be seized by said uprooting devices, the oblique arrangement of the carrier causing the needles thereon to be consecutively protruded beyond the side of the machine and retracted into the machine solely by the travel of said carrier.

2. A machine as in claim 1 wherein the needles project from the carrier at right angles to the plane of the path of travel of the carrier.

3. A machine as in claim 1 wherein the carrier comprises a pair of parallel chains, to each of which chains the needles are rigidly secured at right angles without freedom to transverse movement relatively to said chains.

SIDNEY ALLINGHAM.